(12) United States Patent
Mermoud et al.

(10) Patent No.: US 10,193,912 B2
(45) Date of Patent: Jan. 29, 2019

(54) WARM-START WITH KNOWLEDGE AND DATA BASED GRACE PERIOD FOR LIVE ANOMALY DETECTION SYSTEMS

(71) Applicant: Cisco Technology, Inc., San Jose, CA (US)

(72) Inventors: Grégory Mermoud, Veyras, VS (CH); Jean-Philippe Vasseur, Anchorage, AK (US); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 15/052,257

(22) Filed: Feb. 24, 2016

(65) Prior Publication Data

US 2016/0352764 A1    Dec. 1, 2016

Related U.S. Application Data

(60) Provisional application No. 62/167,392, filed on May 28, 2015.

(51) Int. Cl.
*G06F 11/00* (2006.01)
*H04L 29/06* (2006.01)
*G06N 99/00* (2010.01)

(52) U.S. Cl.
CPC ....... *H04L 63/1425* (2013.01); *G06N 99/005* (2013.01); *H04L 63/1416* (2013.01)

(58) Field of Classification Search
CPC ....... G06N 99/005; G06N 3/08; H04W 12/12; H04W 4/005; G06F 11/3409; G06F 11/3466; G06F 21/552; G06F 2201/86; G06F 8/60; H04L 63/1416; H04L 63/1425

See application file for complete search history.

(56) References Cited

U.S. PATENT DOCUMENTS

| | | | |
|---|---|---|---|
| 8,185,955 B2 | 5/2012 | Cangini et al. | |
| 8,544,087 B1 | 9/2013 | Eskin et al. | |
| 2006/0143709 A1 | 6/2006 | Brooks et al. | |
| 2010/0153316 A1 | 6/2010 | Duffield et al. | |
| 2015/0269050 A1* | 9/2015 | Filimonov | G06F 11/3409 702/183 |
| 2016/0028751 A1* | 1/2016 | Cruz Mota | H04L 63/1408 726/23 |
| 2017/0104775 A1* | 4/2017 | Vasseur | H04L 63/1425 |

* cited by examiner

*Primary Examiner* — Abiy Getachew
(74) *Attorney, Agent, or Firm* — Parker Ibrahim & Berg LLP; James M. Behmke; Stephen D. LeBarron

(57) ABSTRACT

In one embodiment, a device in a network loads an anomaly detection model for warm-start. The device filters input data for the model during a warm-start grace period after warm-start of the anomaly detection model. The model is not updated during the warm-start grace period based on the filtering. The device determines an end to the warm-start grace period. The device updates the anomaly detection model using unfiltered input data for the anomaly detection model after the determined end to the warm-start grace period.

19 Claims, 10 Drawing Sheets

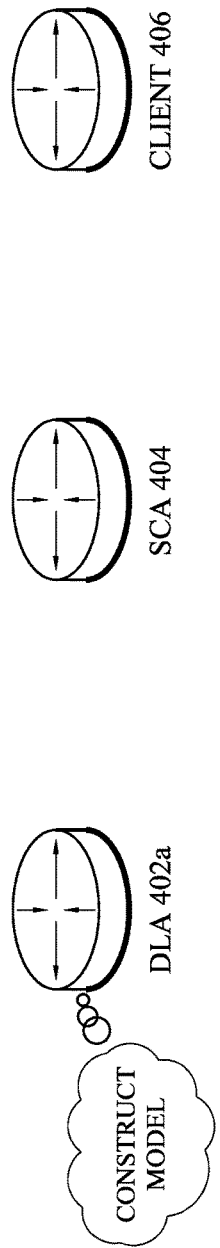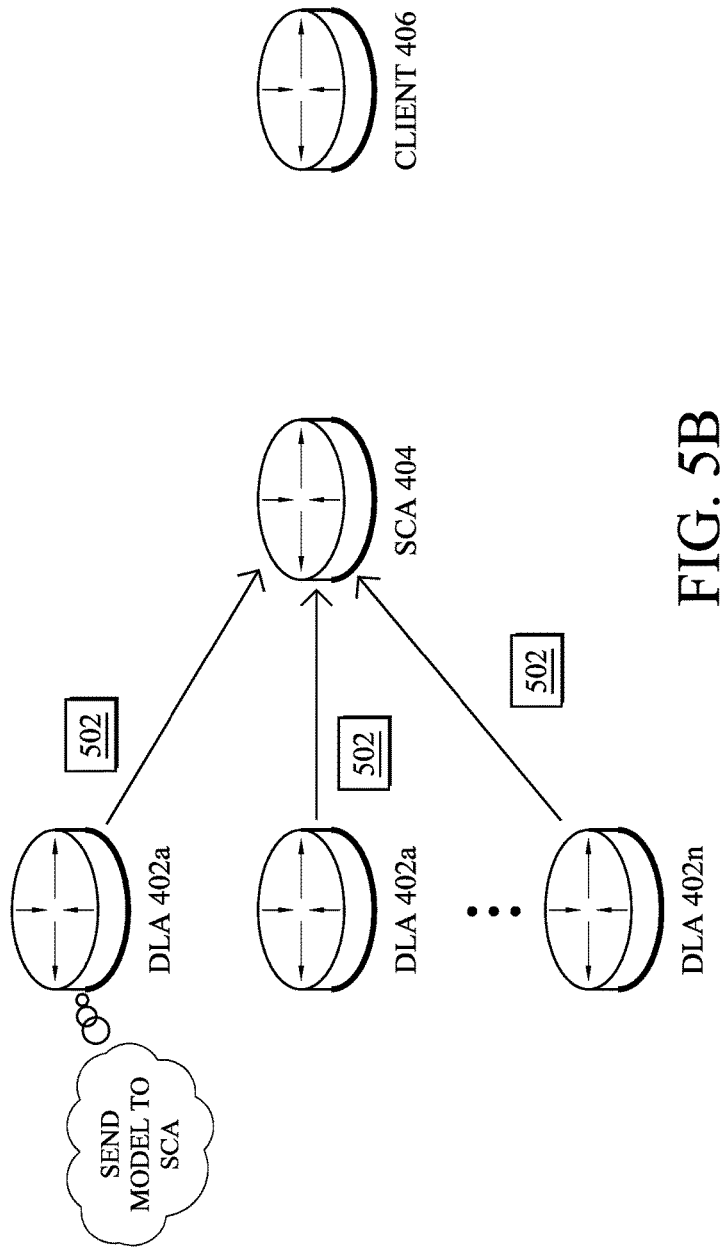

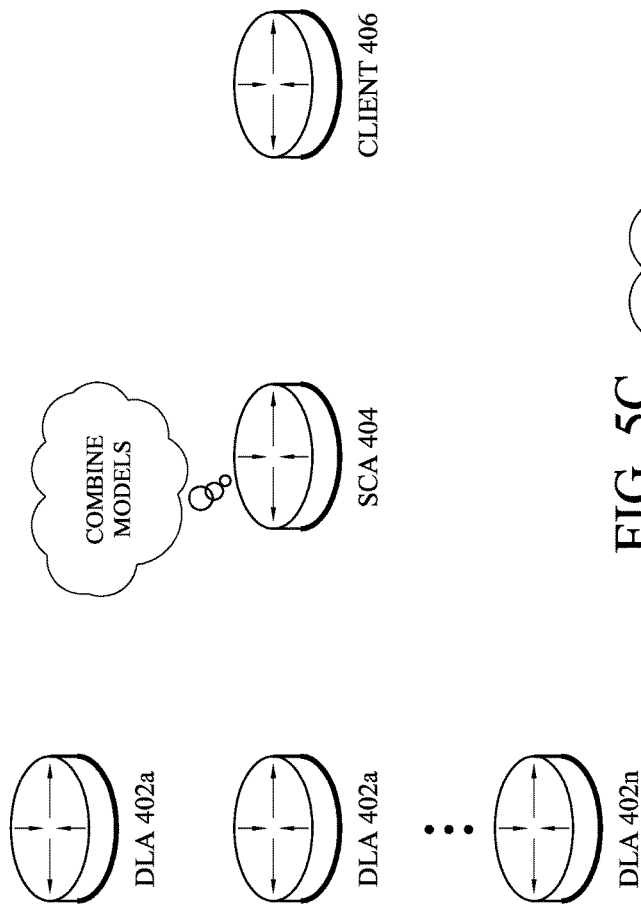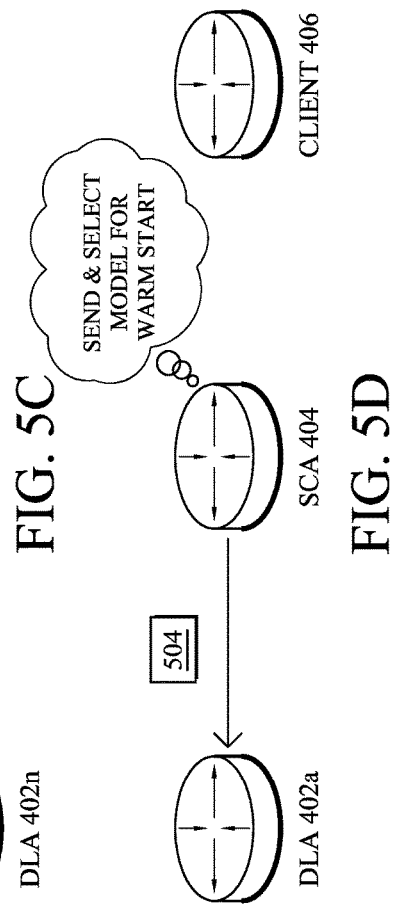

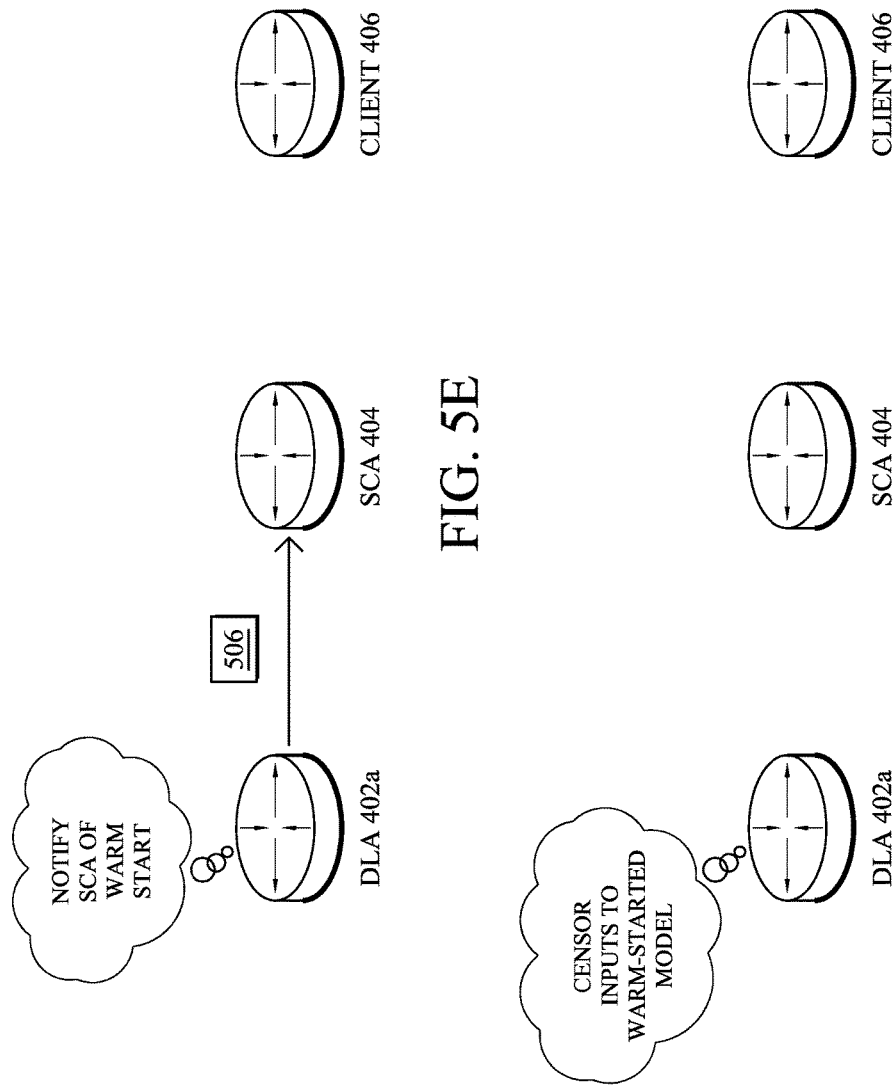

WARM-START WITH KNOWLEDGE AND DATA BASED GRACE PERIOD FOR LIVE ANOMALY DETECTION SYSTEMS

RELATED APPLICATIONS

This application claims priority to U.S. Provisional Application No. 62/167,392, filed May 28, 2015, entitled "WARM-START WITH KNOWLEDGE AND DATA BASED GRACE PERIOD FOR LIVE ANOMALY DETECTION SYSTEMS," by Mermoud et al., the contents of which are hereby incorporated by reference.

TECHNICAL FIELD

The present disclosure relates generally to computer networks, and, more particularly, to warm-start mechanisms for anomaly detection in a computer network.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5F illustrate examples of a warm-start anomaly detection mechanism;

DESCRIPTION OF EXAMPLE EMBODIMENTS

Overview

Figure 1A:
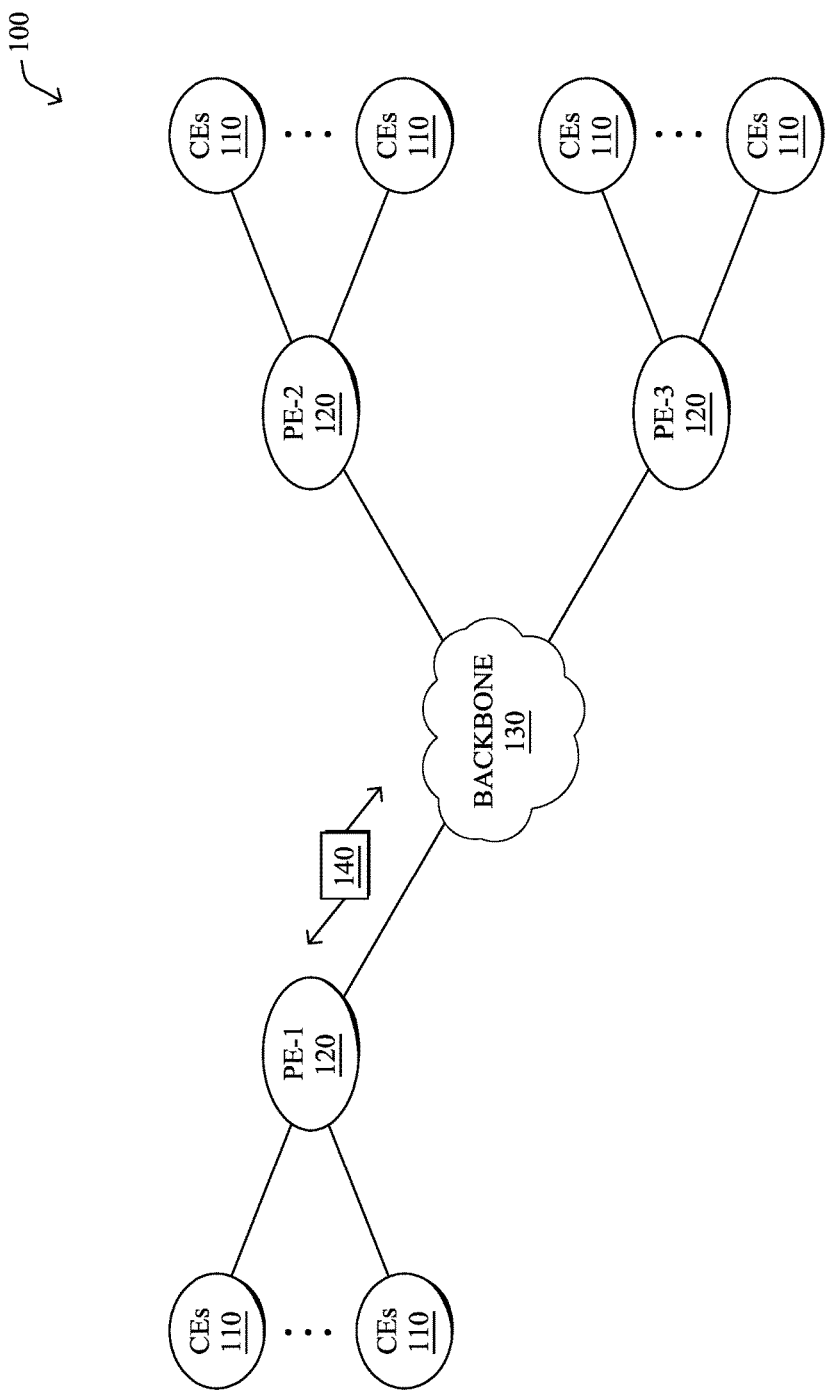
FIGS. 1A-1B illustrate an example communication network.

According to one or more embodiments of the disclosure, a device in a network loads an anomaly detection model for warm-start. The device filters input data for the model during a warm-start grace period after warm-start of the anomaly detection model. The model is not updated during the warm-start grace period based on the filtering. The device determines an end to the warm-start grace period. The device updates the anomaly detection model using unfiltered input data for the anomaly detection model after the determined end to the warm-start grace period.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
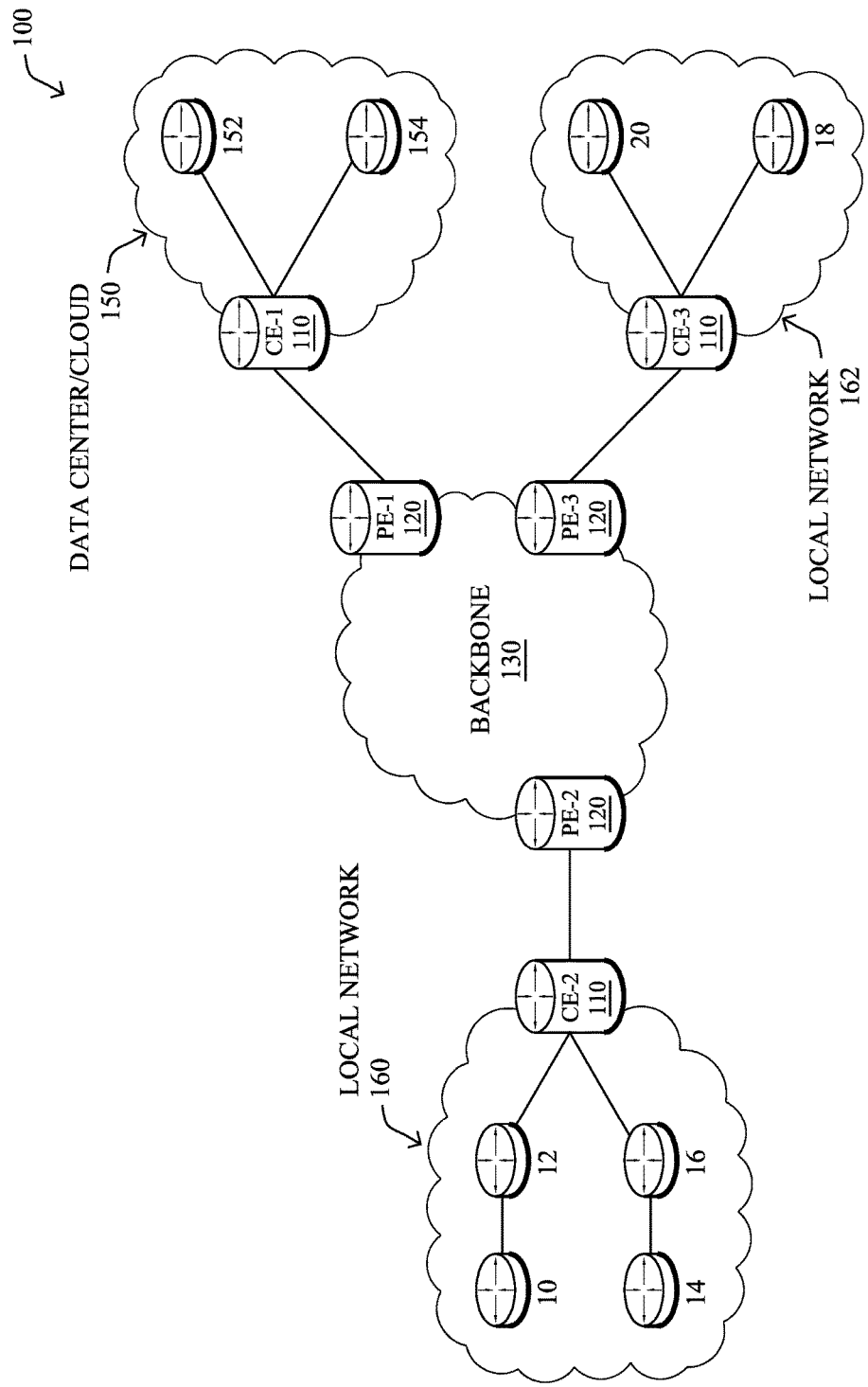

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
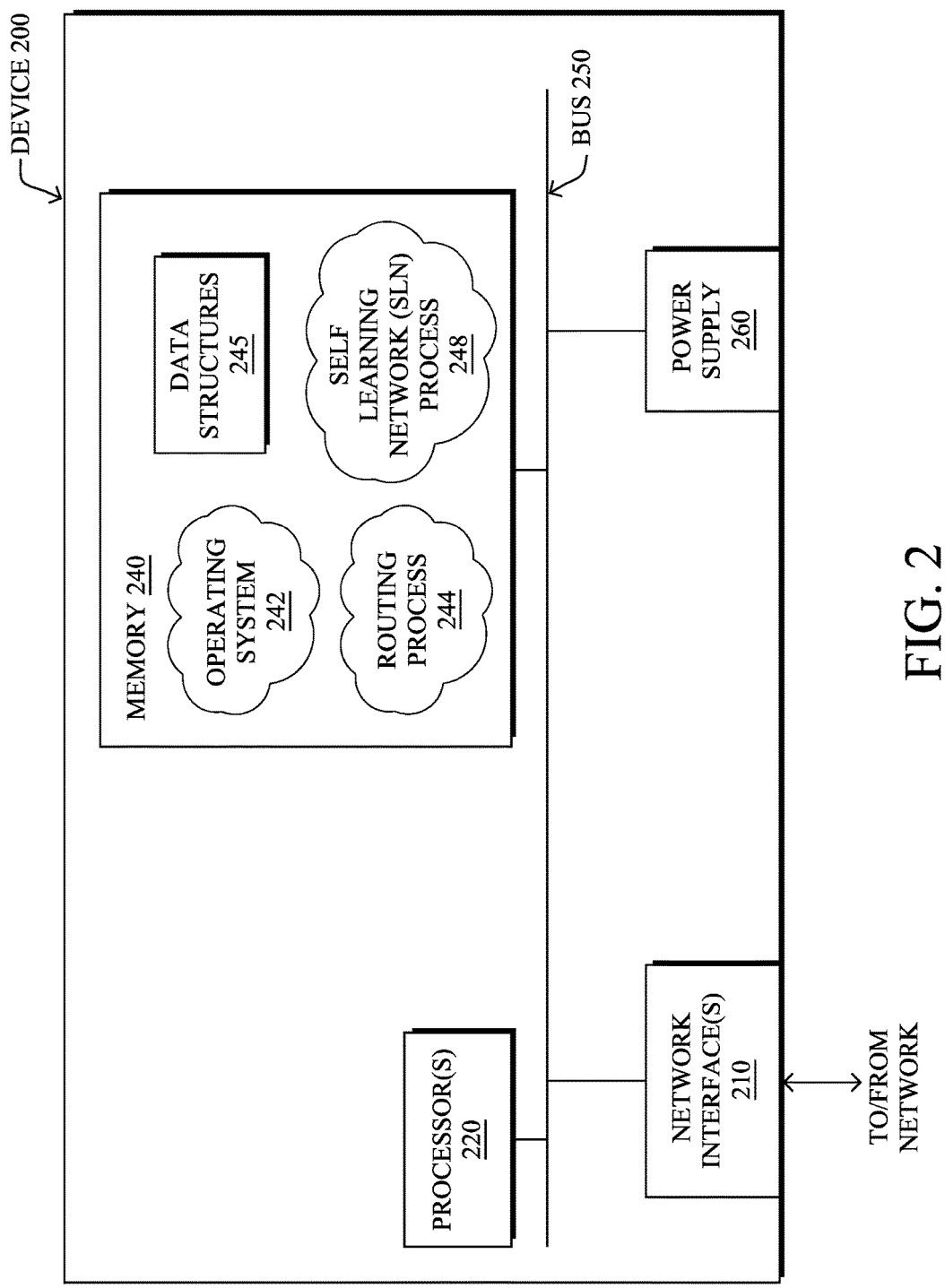
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic black-hole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
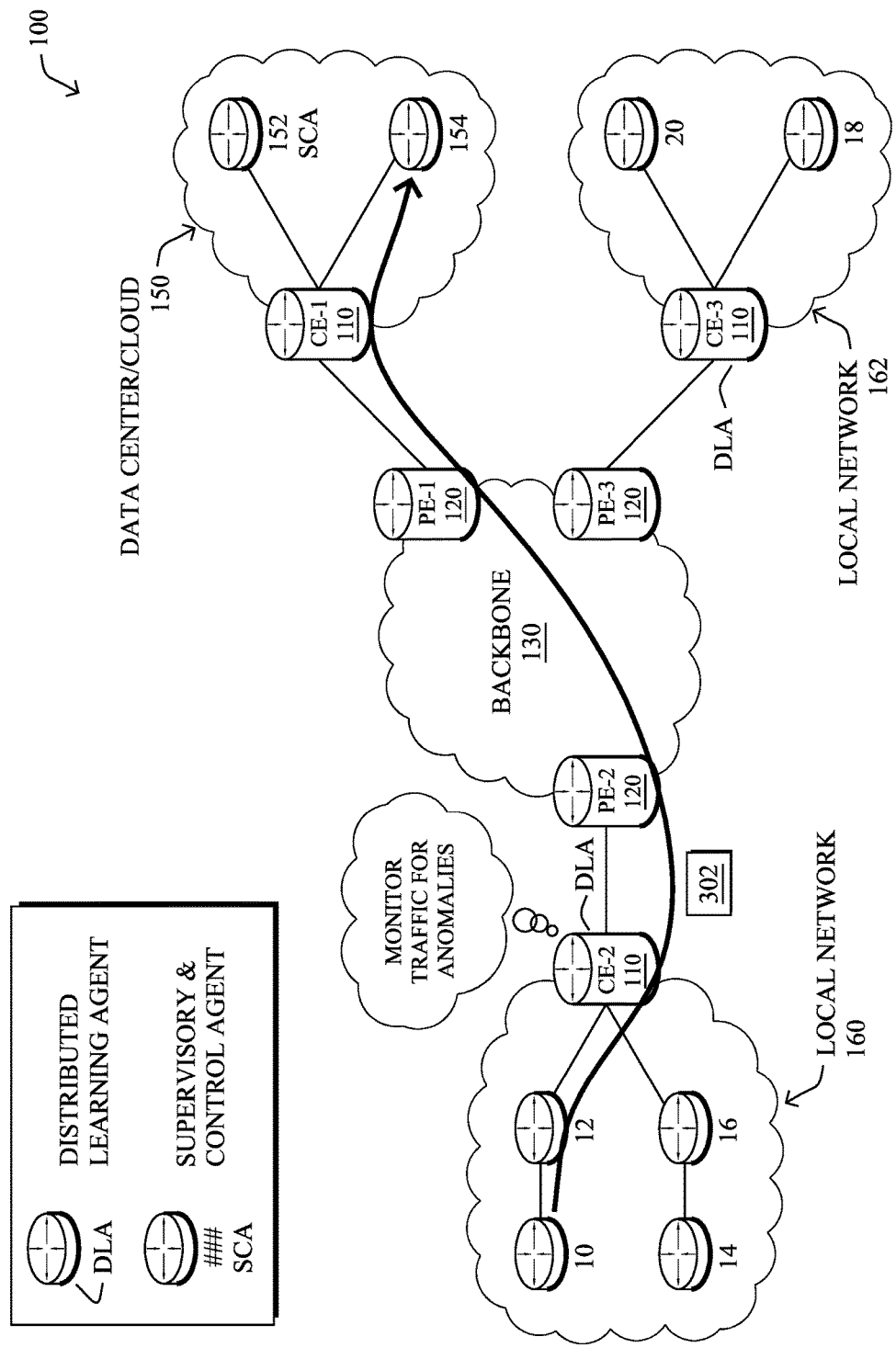
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, many anomaly detection techniques involve constructing a model of normal behavior (thereafter referred to as the model), and base the detection of anomalous behavior on the deviation of instantaneous observations with respect to this model. In some implementations, such as in SLNs, a fixed model is constructed offline, and this model is used without any modification by the anomaly detection system during all of the run time. In other implementations, the model of normal behavior may be continuously updated (e.g., using on-line learning) from an initially empty model. This is often referred to as online anomaly detection or sequential anomaly detection. This allows the model of normal behavior to be constructed based directly on the actual observations, and to adapt in changes in the distribution of these observations.

Such anomaly detection techniques need to be presented with sufficient input data, in order to construct the model of normal behavior. Depending on which technique is used and on the distribution of the observations, this may require observing data for a significant amount of time. The requirement of observing behavior in order to accurately reflect the dynamics in the model is even more exacerbated in models that capture seasonality. Without further handling, this precludes the use of sequential anomaly detection when the anomaly detection system must be available to detect anomalies shortly after startup.

In general, "warm-starting" entails sequentially constructing a model for a sufficient amount of time and writing the resulting model to storage. Then, when starting up the anomaly detection system from scratch, the system may be initialized based on the model previously written to storage. The loaded model can be then be updated continuously according to the sequential anomaly detection procedure.

Warm-starting is not without limitations. Notably, when working with stateful and rich data processing pipelines, the distribution of observations/input data may depend on the amount of time the input data has been observed and on the previous data. In such cases, warm-starting may not work properly or be harmful. Particularly, at startup of the anomaly detection system, observations may not fit within what the previously written model considers normal, due to artifacts and side-effects in the data processing pipeline. Examples of such artifacts include warm-up periods for sliding time windows, underestimation of features related to flow or communication durations, overestimation of the amount of newly opened flows, and, more generally, issues with any feature that has a time-dependent state. As the model is continuously updated, this may lead to a significant degradation of the model.

Additionally, warm-starting an anomaly detection system based on models of normal behavior that have been constructed on the same anomaly detection system may lead to the following issue: if potential anomalies are always present in the observations, the model will not accurately represent normal behavior. As a consequence, it is important to be able to warm-start from previously written models that do not necessarily come from the same observation context, but were instead constructed on potentially cleaner, or, at least, different, observations.

Warm-Start for Anomaly Detection

The techniques herein provide for warm-starting mechanism for warm-starting the anomaly detection systems of DLAs in the network. Notably, upon start-up, the DLAs may not have observations corresponding to normal behaviors to train models in an appropriate fashion. In addition, there may be a delay after the DLA start-up before the data processing pipeline (e.g., feature constructors) are ready. As disclosed herein, DLAs may cooperate with an SCA to construct models adapted to different types of traffic characteristics, and these are used for warm-start. In addition, after warm-start, a DLA may only be allowed to update the model when the observations are determined to be clean enough.

Specifically, according to one or more embodiments of the disclosure as described in detail below, a device in a network loads an anomaly detection model for warm-start. The model is not updated during the warm-start grace period based on the filtering. The device filters input data for the model during a warm-start grace period after warm-start of the anomaly detection model. The device determines an end to the warm-start grace period. The device updates the anomaly detection model using unfiltered input data for the anomaly detection model after the determined end to the warm-start grace period.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 4:
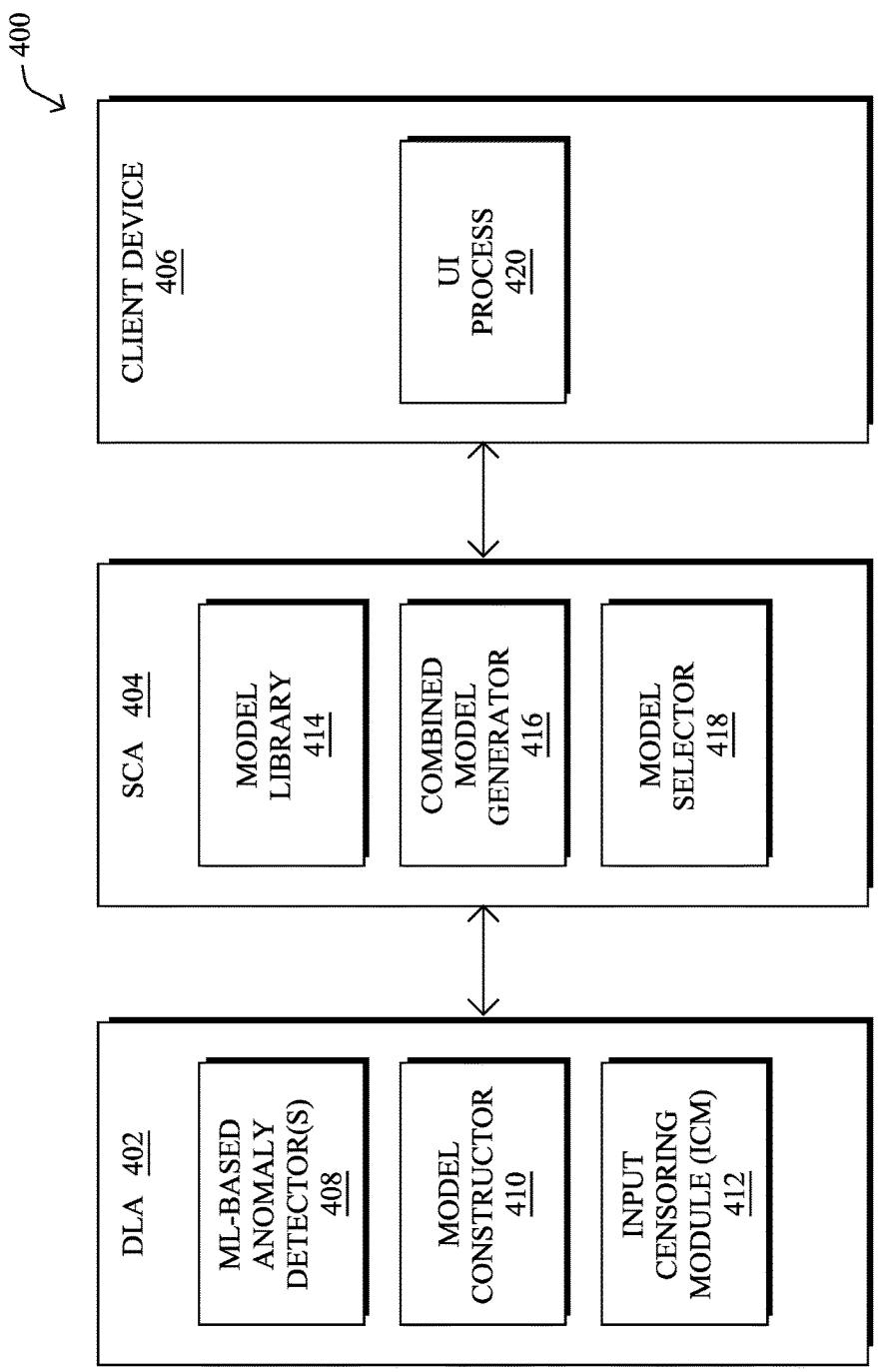
FIG. 4 illustrates an example architecture for warm-starting an anomaly detector deployed in a network.

Operationally, an architecture 400 is illustrated in FIG. 4 for warm-starting an anomaly detector deployed in a network. As shown, and as described above, an SLN implementation may include one or more DLAs 402, at least one SCA 404, and potentially one or more client devices 406 that interface with SCA 404. The devices 402-406 may execute modules/processes 408-420 as part of an SLN process (e.g., SLN process 248). As would be appreciated, processes 408-420 may be standalone applications, implemented as part of a single application, or combined in any other manner. In addition, the functionality described herein with respect to any of processes 408-420 may be optional in certain implementations.

Client device 406 may be any form of client device such as a desktop computer, laptop computer, mobile device, wearable device, etc. that executes a user interface (UI) process 420. In various embodiments, UI process 420 may communicate with SCA 404 to provide the user of client device 406 with information regarding the anomaly detecting SLN deployed in the network (e.g., via a display, etc.). Additionally, UI process 420 may be configured to allow the user to provide supervisory control over the SLN by sending control parameters and/or instructions from client device 406 to SCA 404. For example, the user of client device 406 may request additional information from the SLN regarding a particular portion of the network, traffic flow, etc. As would be appreciated, UI process 420 may be a stand-alone application or may alternatively be implemented as a web-based interface such as an interface based on the Representational State Transfer (REST) protocol or the like. In further embodiments, SCA 404 may execute UI process 420, allowing the user to interface with SCA 404 directly.

As show, DLA 402 may execute one or more ML-based anomaly detectors 408. Generally, anomaly detector 408 may analyze input data regarding the state of the network and, based on the analysis, label the information as either normal or indicative of a network anomaly. Such information may include, but is not limited to, traffic information (e.g., the applications associated with the traffic, the volume of traffic, the source and/or destination of the traffic, etc.), device information (e.g., memory consumption, processor consumption, etc.), or any other information regarding the current state of the network.

In various embodiments, the ML-based anomaly detectors 408 may be unsupervised machine learning processes such as ANNs, clustering processes, or the like. In other words, detector(s) 408 may detect anomalous behavior based on the deviation of observed network behavior from a trained behavioral model. This differs from supervised approaches that associate a particular pattern with a classification/label (e.g., if pattern Q is observed, a DoS attack is detected).

DLA 402 may also execute a model constructor 410 configured to construct and/or update the model(s) of anomaly detector(s) 408. In some embodiments, the construction of the initial models can be done online and independently at the level of each DLA 402. In another embodiment, the construction of the initial models can be done online by a set of defined DLAs that can be trusted. In yet another embodiment, the initial models can be constructed either online or in batch mode from pre-cleaned customer traces.

Each model of anomaly detector(s) 408 may be characterized by a set of representative traffic and network characteristics that are representative of the model. The traffic characteristics may comprise a number of parameters such as the traffic type (e.g., layer3, UDP/TCP, applications, etc.) along with corresponding statistical characteristics. The network characteristics will generally indicate the type of network that was used to build the model such as the number of devices per type (e.g., mobile devices, servers, or other device types), etc. Once constructed, model constructor 410 may update a model based on observations/input data regarding the network (e.g., using online learning).

In another embodiment, SCA 404 may execute a combined model generator 416, to generate a given anomaly detection model for deployment to one or more DLAs 402. For example, combined model generator 416 may analyze observation data and/or previously constructed models from a plurality of DLAs 402, to construct a combined model for the group of reporting DLAs 402. This combined model can then be used to analyze traffic and network data with similar characteristics as that of the group of devices that were used to build the combined model.

SCA 404 or another device in the network may also maintain a model library 414 of the anomaly detection models deployed in the network. In particular, model library 414 may be constructed by running a sequential anomaly detection procedure on one or multiple DLAs 402 (e.g., anomaly detectors 408 and model constructors 410), and periodically writing the corresponding models of normal behavior to a permanent storage. Each model may then be stored in library 414 (e.g., a data structure within a memory, such as memory 240 of device 200), identified by a model ID along with the traffic and network characteristics used by the model. SCA 404 may also perform self-verification of the models in model library 414, by checking that reloading the model that was written to disk leads to the same model. This self-verification is important as failures or bugs may lead to issues with the overall method.

SCA 404 may also execute a model selector 418 configured to select and push a given anomaly detection model to a DLA for warm-start. For example, SCA 404 may select a model written to model library 414 (e.g., a combined model, a model from a particular DLA 402, etc.). In some embodiments, model selector 418 may select a given model for deployment, to ensure that the network and traffic characteristics at the target DLA 402 and anomaly detection system are similar to those that were used to construct the selected model.

According to some embodiments, DLA 402 may also execute an input censoring module (ICM) 412. Generally, ICM 412 may be configured to censor (e.g., filter) input data during a warm-start grace period, after an anomaly detection model is warm-started at DLA 402. Notably, ICM 412 may filter artifacts present in the observation input data from being used to update the model, immediately after warm-starting the model. After completion of the grace period, and after the artifacts have tapered off, ICM 412 may end its censoring of the input data, thereby allowing the model updates by model constructor 410 to continue.

Referring now to FIGS. 5A-5F, examples are shown of a warm-start anomaly detection mechanism, according to various embodiments. As shown in FIG. 5A, a given DLA, DLA 402a, may construct an unsupervised anomaly detection model based on its available observation/input data. For example, DLA 402a may use online learning to construct the model (e.g., based on input data from a sliding observation window, etc.). In another embodiment, DLA 402a may construct the model using pre-cleaned network trace data.

As shown in FIG. 5B, the various DLAs 402 (e.g., a first DLA 402a, a second DLA 402b, through an nth DLA 402n) may each construct an initial anomaly detection model without any supervision (potentially using local techniques to enhance the robustness of this model) and push the models to SCA 404. To that end, any of the DLAs 402 may send a Built_Model( ) message 502 to SCA 404 comprising information regarding the constructed models. In various cases, message 502 may be a custom IPv4 or IPv6 unicast message that includes information such as the source ID (e.g., the address of the sending DLA), the model ID, the associated traffic and network characteristics described above, or any other information regarding the model. This message is then sent by the DLA to the SCA when the model is ready. As noted previously, in some embodiments, only a subset of the DLAs that are deemed trustworthy (e.g., by client device 406) may be selected to send their constructed models to SCA 404.

As shown in FIG. 5C, in response to receiving a Built_Model( ) message 502, SCA 404 may construct a combined model from each homogeneous group of traffic and network characteristics received via messages 502. This combined model is to be used on traffic and networks with similar characteristics as that of the group used to build the model. Note that more than one SCA-built reference model may be computed according to the different type of network monitored by the DLAs. In turn, SCA 404 may store each of the received models and/or any combined models, in model library 414. For example, each model may be identified by its model ID along with the corresponding homogeneous group of traffic and network characteristics used to construct the stored model.

In one embodiment, the models can be combined into a meta-model, where every observation is scored by every model and the resulting scores are combined using an aggregation and decision making procedure (e.g., combined model generator 416). This type of method is referred to as an ensemble method, and the aggregation procedure can involve computing an average, maximum, or quantile of the set of scores. The individual models can also be attributed weights, based on their past performance, on user feedback (e.g., via UI process 420), or on uncertainty metrics, such that higher weight models have more influence towards the final score.

In another embodiment, the models can be combined into a single model using techniques depending on the specifics of the anomaly detection system. This may involve aggregating weights and representations used in the internals of the anomaly detection model. In doing so, even if anomalies are present at a given time in a specific DLA, the global model resulting from the combination of tens or hundreds of DLAs will not be too biased by those anomalies. In another embodiment, DLAs may share and merge these models using a peer-to-peer network.

A further aspect of the techniques herein dictates that when an anomaly detection system must be started, an initial model may be selected from the library (e.g., model library 416), in order to warm-start the anomaly detection system based on this model. The library of models is constructed using any of the techniques described above, and the selection is made amongst these models.

As shown in FIG. 5D, SCA 404 may select a particular model from model library 416 for warm-start on one or more DLAs and distribute the models via a Ref_Model( ) message 504. SCA 404 may make the selection of which models from the library should be sent to which of the DLAs is made by SCA to ensure that the network and traffic characteristics at the target/receiving DLA and anomaly detection system are similar to those used to construct the distributed model. For a given target DLA, e.g., DLA 402a, SCA 404 may decide not to select a model even if it was constructed based on traffic characteristics similar to that observed on DLA 402a during the short period. This may be the case if SCA 404 does not have sufficient confidence that these are representative of long-term traffic and network characteristics for DLA 402a. This may also be the case if the traffic characteristics at DLA 402a are considered by SCA 404 to have been measured too long ago.

Ref_Model message 504 may be a custom IPv4 or IPv6 message sent by SCA 404 as a unicast message or multicast to the respective DLAs. Message 508 may include only the model ID, if SCA 404 determines that the corresponding model is already cached at the target DLA. Alternatively, message 504 may include the full information about the selected model, allowing the receiving DLA to use the received model. In various cases, SCA 404 may perform the selection on-demand based on queries from the DLAs (e.g., at startup of the DLAs), periodically for all DLAs, or in response to receiving a request from UI process 420.

In another aspect, as shown in FIG. 5E, a custom Model_Notif( ) message 506 is introduced that may be sent by a DLA when loading a model for warm-start. For example, whenever DLA 402a loads a model for warm-start, DLA 402a may send a Model_Notif( ) notification message 506 to SCA 404, with the ID of the model that has been loaded. This information can be further used by SCA 404 when assessing outputs of anomaly detection system from DLA 402. In another embodiment, a custom flag may be added to the set of reported anomalies (with no need to pre-inform SCA 404) on a per anomaly basis, to indicate the ID of the model that was used for warm-start, as well as optional extra information such as the amount of training since warm-start, and metrics quantifying how much the model has changed since warm-start.

In a further aspect, as shown in FIG. 5F and described above, a DLA (e.g., DLA 402a) may execute an ICM module/process (e.g., ICM 412) that decides when to start presenting new input data to the warm-started anomaly detection system (e.g., when the learning process shall start). Indeed, albeit the anomaly detection system does not start from scratch, one must still avoid presenting the anomaly detection system with observations that would be subject to artifacts related to the startup of the data-processing pipeline (e.g., feature constructors) and/or to anomalies in the initial training data. In the following, a grace period refers to the time period during which observations are censored.

In one embodiment, the anomaly detection system (e.g., anomaly detectors 408) may be encapsulated within the ICM, whose role it is to censor input observations to the anomaly detection system for a certain period of time (i.e., during the warm-start grace period). In other words, the DLA may perform both anomaly detection and ICM functions. Generally, the executed ICM may present the anomaly detection system with observations (e.g., input data regarding the observed state of the network) only after a certain period of time, that is, when the observations are deemed to be representative of the normal behavior. Because of the censorship, the anomaly detection system will not update the normal behavior model at all during the grace period. However, the warm-started anomaly detection system may still be used by the ICM to evaluate observations. Said differently, any online training of the model may be postponed during the grace period, to ensure that artifacts from the warm-start have tapered off sufficiently.

The ICM may use any or all of the following to decide when the grace period shall end:

A minimum period of time can be fixed for the grace period. This fixed period can be determined using domain-specific knowledge of the processing pipeline and its constituting components in order to estimate a minimum period of time after which it can be expected that a limited amount of artifacts due to the pipeline are present in the observations. This may include estimating the time required for sliding windows to warm-up, or for features related to flows to provide an unbiased estimate of the actual underlying quantities that are to be estimated.

Observation are fed to the warm-started anomaly detection system for evaluation only, and transformed thereby into a normalized score indicating to what extent the observation is considered normal according to the anomaly detection system. An estimator of the distribution of such scores is computed. This can be an estimator of various quantiles of the resulting score distribution, of standard deviation, or of maximum. Here, normalized score refers to a score in a bounded range. When the score distribution as described by the estimate is considered to have been sufficiently concentrated around the minimum score value according to a domain-specific criterion for a given period of time (e.g., a parameter of the component), the grace period is marked over.

In another embodiment, the grace period can be discontinuous. In other words, the system may decide to allow the anomaly detection system to learn for some period of time that the ICM deems "clean", but may then revert this decision at a later time. As the conditions for ending the grace period are met as per the methods above, the ICM stops censoring, and the anomaly detection system is allowed to continuously learn on any further incoming observation.

Figure 6A:
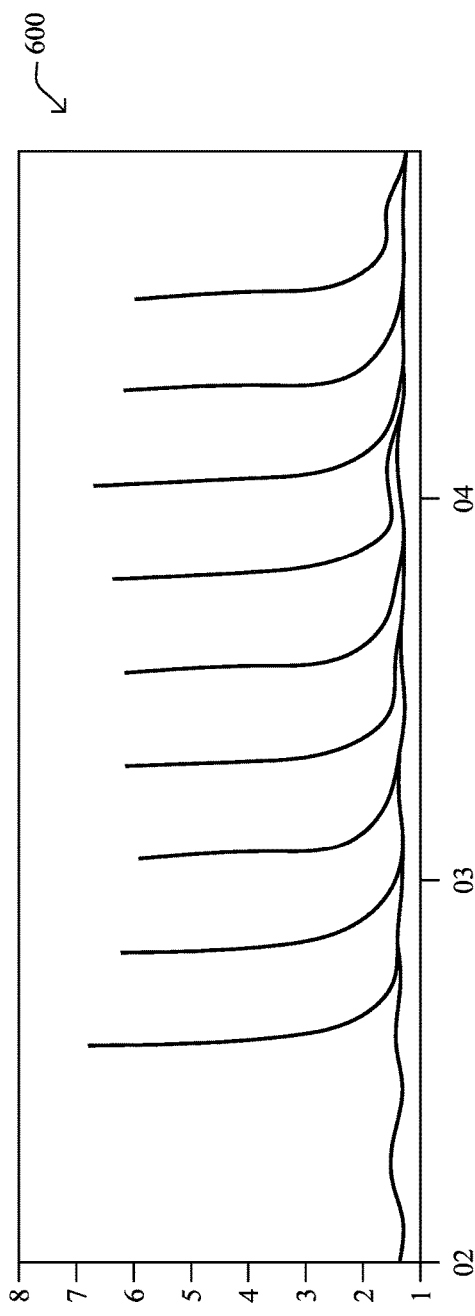
FIGS. 6A-6B illustrate example test results using the techniques herein.
Figure 6B:
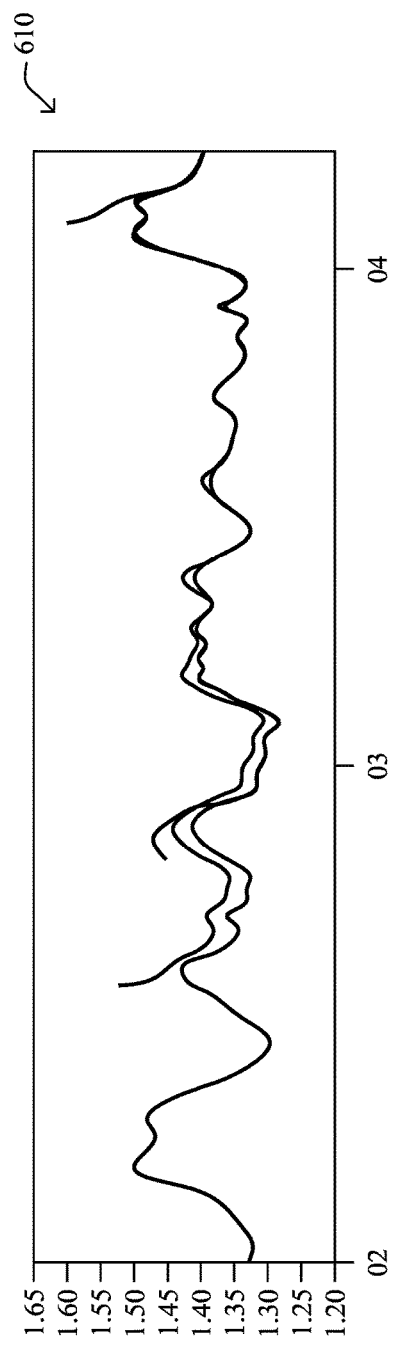

Referring now to FIGS. 6A-6B, example test results are shown illustrating the effect of warm-starting an anomaly detection system (e.g., as opposed to a cold-start where no previously written model is loaded and an empty model is used at startup). FIGS. 6A-6B display, at each time point (the x-axis), the total score (the y-axis) of the anomaly detection system in terms of how normal the underlying model considers the observations/input data to the model. In particular, a high score indicates that observations were mostly abnormal according to the current model of normal behavior, while a low score indicates the opposite.

Graph 600 in FIG. 6A illustrates the score of multiple anomaly detection systems, when cold-started at different points in time. Each curve indicates an anomaly detection system, which were started at successive times. The first line on the left of graph 600 indicates an anomaly detection system that was started prior to the test window (e.g., well prior to time 02 shown). As can be seen, traditional anomaly detection systems usually do not have a good model of normal behavior, and consider most observations as abnormal. After sufficient time, the model of normal behavior is better, and scores are lower, and become similar to that of the anomaly detection system started much earlier.

Graph 610 illustrates the score of multiple anomaly detection systems, when using the warm-start mechanism described herein. Each curve indicates an anomaly detection system, and these are started at successive times. Similar to graph 610, the first plot on the left of graph 610 indicates an anomaly detection system that was started prior to the test window (e.g., prior to time 02 shown). As can be seen, the warm-started anomaly detection systems converge very quickly to low scores that are similar to that of the anomaly detection system started much earlier.

Figure 7:
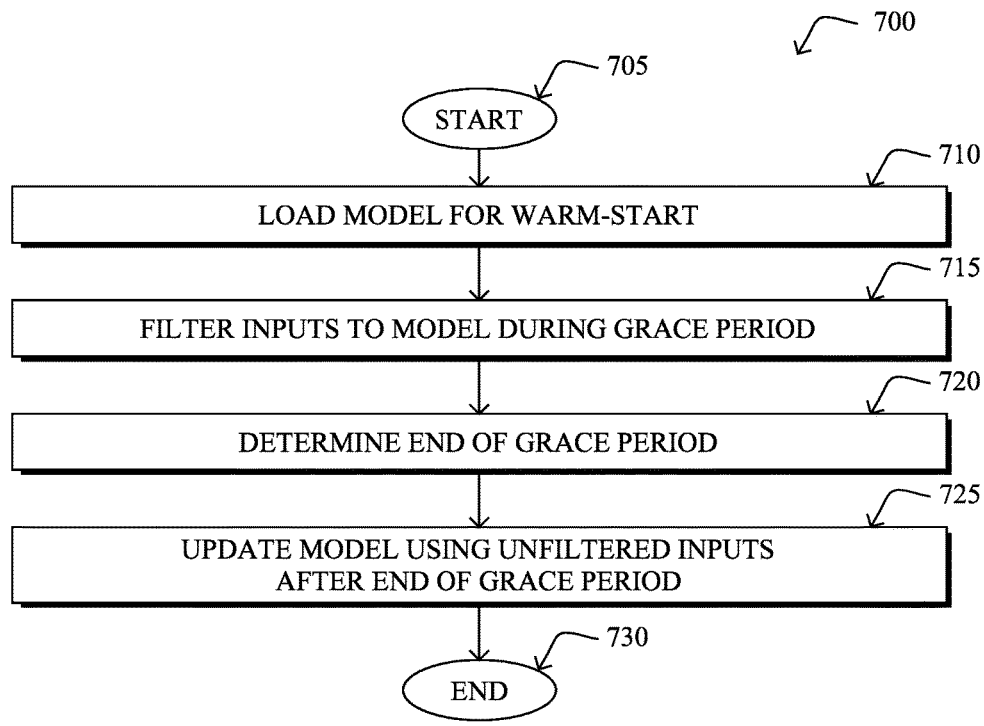
FIG. 7 illustrates an example simplified procedure for warm-starting an anomaly detector.

Referring now to FIG. 7, an example simplified procedure for warm-starting an anomaly detector is shown, in accordance with the embodiments herein. In general, procedure 700 may be performed by a device in a network (e.g., device 200, etc.), such as a DLA, by executing stored instructions. Procedure 700 begins at step 705 and continues on to step 710 where, as described in greater detail above, the device may load an anomaly detection model for warm-start. In some embodiments, the model may be selected by a supervisory device, such as an SCA. For example, the SCA may provide the model to the device or, if the model is already stored by the device, may instead provide an instruction to the device to use the particular model. This selection may be based on, e.g., the similarity between the network and traffic characteristics used to train the selected model and the network and traffic characteristics observable by the device. In one embodiment, the model may be an unsupervised machine learning model. Such a model may be trained by another device that observes similar network and traffic characteristics as the device. In other cases, the model may be a combined model based on observations from any number of devices deployed in the network.

At step 715, as detailed above, the device may filter/censor inputs to the warm-started model during a warm-start grace period. Notably, artifacts present in the data-processing pipeline may negatively affect the model directly after startup, as feature constructors may not be ready, immediately. In addition, the observations/input data for the model directly after startup may not fit within what the model considers to be normal. Such a warm-start grace period may mitigate these conditions by filtering the inputs to the warm-started model for purposes of updating the model. In other words, the model may only be updated after conclusion of the warm-start grace period due to the filtering.

At step 720, the device may determine an end to the warm-start grace period, as described in greater detail above. In some embodiments, the end of the warm-start grace period may be a fixed amount of time based, e.g., on an estimate as to when the artifacts in the processing pipeline will taper off. In another embodiment, the end of the warm-start grace period may be based on a normalized score that represents the degree to which the model considers the current observations/input data normal. For example, the device may still feed the input data to the model, but in a way that prevents the model from being updated during this time, to obtain the scores. When the scores cross one or more thresholds, the device may determine that the grace period can end. For example, if the score remains within a bounded range or below a given threshold for a certain amount of time, the device may determine that the warm-start grace period can end. In yet another embodiment, the grace period may be discontinuous. In such cases, the device may end the grace period if the device determines that the input data is clean/normal, but may revert back to filtering the input data for purposes of model updates at a later time.

At step 725, as detailed above, the device may update the model using unfiltered inputs after conclusion of the warm-start grace period. In particular, once the grace period ends, the device may use online learning to continuously or periodically update the model based on the most recent network and traffic observations. Procedure 700 then ends at step 730.

It should be noted that while certain steps within procedure 700 may be optional as described above, the steps shown in FIG. 7 are merely examples for illustration and certain other steps may be included or excluded as desired. Further, while a particular order of the steps is shown, this ordering is merely illustrative, and any suitable arrangements of the steps may be utilized without departing from the scope of the embodiments herein.

The techniques described herein, therefore, may enhance the use of sequential anomaly detection on live machines and routers. In these environments, the system may be subject to interruptions or reboots, and it is important that the system be able to quickly and reliably get back to a state with anomaly detection capabilities as before the interruption. In addition, the techniques herein have dramatic implications when considering the deployment of separate anomaly detection system on thousands of nodes at the same time, as envisioned in many SLN systems. In such a situation, a standard model of normal behavior can be deployed on all nodes. Each node can then proceed to continuously update the model in accordance with the specifics of the observation context of the node. This allows the time required to set up a large network of functional anomaly detection systems to be significantly reduced.

While there have been shown and described illustrative embodiments that provide for the warm-start of an anomaly detection system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    loading, by a device in a network, an anomaly detection model for warm-start;
    filtering, by the device, input data for the model during a warm-start grace period after warm-start of the anomaly detection model, wherein the model is not updated during the warm-start grace period based on the filtering;
    determining, by the device, an end to the warm-start grace period;

updating, by the device, the anomaly detection model using unfiltered input data for the anomaly detection model after the determined end to the warm-start grace period; and sending, by the device, a notification of the warm-start of the anomaly detection model to a supervisory device in the network.

2. The method as in claim 1, further comprising:
receiving, at the device, the anomaly detection model from a supervisory device in the network.

3. The method as in claim 1, wherein the anomaly detection model was constructed based on network characteristics received from a plurality of deployed anomaly detectors.

4. The method as in claim 1, wherein determining the end to the warm-start grace period comprises:
determining, by the device, a minimum period of time after which artifacts in the input data for the model are expected to taper off.

5. The method as in claim 1, wherein the artifacts are attributable to at least one of: a sliding evaluation time window for the anomaly detection model, an underestimation of features in the input data related to flow or communication durations, or an overestimation of newly opened flows.

6. The method as in claim 1, wherein determining the end to the warm-start grace period comprises:
determining, by the device, one or more thresholds for a normalized score for the input data, wherein the normalized score is indicative of an amount of artifacts present in the input data for the model, and wherein the end to the warm-start grace period is determined based on the normalized score crossing the one or more thresholds.

7. The method as in claim 1, wherein the warm-start grace period is discontinuous.

8. The method as in claim 1, further comprising:
causing, by the device, the anomaly detection model to be stored in a library of anomaly detection models used in the network.

9. The method as in claim 1, wherein the anomaly detection model is an unsupervised machine learning model.

10. An apparatus, comprising:
one or more network interfaces to communicate with an anchorless network;
a processor coupled to the network interfaces and configured to execute one or more processes; and
a memory configured to store a process executable by the processor, the process when executed configured to:
load an anomaly detection model for warm-start;
filter input data for the model during a warm-start grace period after warm-start of the anomaly detection model, wherein the model is not updated during the warm-start grace period based on the filtering;
determine an end to the warm-start grace period;
update the anomaly detection model using unfiltered input data for the anomaly detection model after the determined end to the warm-start grace period; and
send a notification of the warm-start of the anomaly detection model to a supervisory device in the network.

11. The apparatus as in claim 10, wherein the process when executed is further configured to:
receive the anomaly detection model from a supervisory device in the network.

12. The apparatus as in claim 10, wherein the anomaly detection model was constructed based on network characteristics received from a plurality of deployed anomaly detectors.

13. The apparatus as in claim 10, wherein the process when executed is further configured to:
determine a minimum period of time after which artifacts in the input data for the model are expected to taper off.

14. The apparatus as in claim 13, wherein the artifacts are attributable to at least one of: a sliding evaluation time window for the anomaly detection model, an underestimation of features in the input data related to flow or communication durations, or an overestimation of newly opened flows.

15. The apparatus as in claim 10, wherein the apparatus determines the end to the warm-start grace period by:
determining one or more thresholds for a normalized score for the input data, wherein the normalized score is indicative of an amount of artifacts present in the input data for the model, and wherein the end to the warm-start grace period is determined based on the normalized score crossing the one or more thresholds.

16. The apparatus as in claim 10, wherein the warm-start grace period is discontinuous.

17. The apparatus as in claim 10, wherein the process when executed is further configured to:
cause the anomaly detection model to be stored in a library of anomaly detection models used in the network.

18. The apparatus as in claim 10, wherein the anomaly detection model is an unsupervised machine learning model.

19. A tangible, non-transitory, computer-readable media having software encoded thereon, the software when executed by a processor of a device in a network configured to:
load an anomaly detection model for warm-start;
filter input data for the model during a warm-start grace period after warm-start of the anomaly detection model, wherein the model is not updated during the warm-start grace period based on the filtering;
determine an end to the warm-start grace period;
update the anomaly detection model using unfiltered input data for the anomaly detection model after the determined end to the warm-start grace period; and
send a notification of the warm-start of the anomaly detection model to a supervisory device in the network.

* * * * *